US012803295B2

(12) United States Patent
Zhao et al.

(10) Patent No.: US 12,803,295 B2
(45) Date of Patent: Nov. 17, 2026

(54) CONTROL METHOD, DEVICE, APPARATUS AND STORAGE MEDIUM FOR SUPERCAPACITOR ENERGY STORAGE DEVICE

(71) Applicant: Beijing Jiaotong University, Beijing (CN)

(72) Inventors: Yajie Zhao, Beijing (CN); Zhongping Yang, Beijing (CN); Fei Lin, Beijing (CN); Zhihong Zhong, Beijing (CN); Hu Sun, Beijing (CN); Xiaochun Fang, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 690 days.

(21) Appl. No.: 18/468,006

(22) Filed: Sep. 15, 2023

(65) Prior Publication Data

US 2024/0106261 A1 Mar. 28, 2024

(30) Foreign Application Priority Data

Sep. 19, 2022 (CN) ......................... 202211136601.6

(51) Int. Cl.
*H02J 7/34* (2006.01)
*B60L 53/55* (2019.01)
(Continued)

(52) U.S. Cl.
CPC .............. *H02J 7/345* (2013.01); *B60L 53/55* (2019.02); *B60L 53/62* (2019.02); *H02J 7/82* (2026.01);
(Continued)

(58) Field of Classification Search
CPC ...... B60L 53/55; B60L 53/62; B60L 2200/26; H02J 7/345; H02J 7/82; H02J 7/84; H02J 7/94
(Continued)

(56) References Cited

U.S. PATENT DOCUMENTS

2013/0191049 A1* 7/2013 Sales Casals ...... G01R 31/1272 702/58
2018/0143257 A1* 5/2018 Garcia ................. G01R 31/367
2020/0207230 A1* 7/2020 Evans ..................... B60L 53/30

FOREIGN PATENT DOCUMENTS

CN 121663587 A * 3/2026 ................ H02J 7/80

OTHER PUBLICATIONS

CN-121663587-A, Eng Translation, 33 pages (Year: 2025).*

* cited by examiner

*Primary Examiner* — Julian D Huffman
*Assistant Examiner* — Ryu-Sung P. Weinmann
(74) *Attorney, Agent, or Firm* — McClure, Qualey & Rodack, LLP

(57) ABSTRACT

A control method, device, apparatus and storage medium for a supercapacitor energy storage device is provided, where the method includes: collecting life characterization parameters of the supercapacitor energy storage device and performing life evaluation to obtain a life evaluation result, inputting the life evaluation result into a constructed fuzzy rule base, and outputting a constraint condition adjustment parameter; obtaining a constraint condition according to the constraint condition adjustment parameter, and optimizing control parameters using a genetic algorithm in conjunction with an optimized objective function to obtain first control parameters; and controlling charging and discharging currents of the supercapacitor energy storage device using a
(Continued)

droop control method according to the first control parameters.

20 Claims, 5 Drawing Sheets

(51) Int. Cl.
*B60L 53/62* (2019.01)
*H02J 7/82* (2026.01)
*H02J 7/84* (2026.01)
*H02J 7/94* (2026.01)

(52) U.S. Cl.
CPC *H02J 7/84* (2026.01); *H02J 7/94* (2026.01); *H02J 2207/50* (2020.01)

(58) Field of Classification Search
USPC .......................................................... 320/166
See application file for complete search history.

CONTROL METHOD, DEVICE, APPARATUS AND STORAGE MEDIUM FOR SUPERCAPACITOR ENERGY STORAGE DEVICE

CROSS-REFERENCE TO RELATED APPLICATION

This patent application claims the benefit and priority of Chinese Patent Application No. 202211136601.6 filed with the China National Intellectual Property Administration on Sep. 19, 2022, the disclosure of which is incorporated by reference herein in its entirety as part of the present application.

TECHNICAL FIELD

The present disclosure relates to the technical field of urban rail transit, in particular to a control method, device, apparatus and storage medium for a supercapacitor energy storage device.

BACKGROUND

In the field of urban rail transit, recovering and reusing the regenerative braking energy of trains is the main means to reduce the traction energy consumption of a system. Among various technical routes of train braking energy recovery and utilization, the ground energy storage technology based on a supercapacitor has many advantages, such as simple structure and maintenance, no interface with an alternating current side of a traction power supply system, a power compensation function for the traction power supply system and so on, and has become the main direction of future applications. With the further demand for energy conservation and low carbon in the urban rail transit industry and the reduction of the cost of the supercapacitor, the supercapacitor energy storage device will be more widely used in the field of urban rail transit, so that a reasonable and effective control and management method has become critical to optimize the application benefits.

At present, the control and management method for the ground supercapacitor energy storage device of the urban rail transit is mainly implemented at two layers. The underlying control method uses a double closed-loop control method based on voltage and current. The energy storage device realizes charging and discharging management according to the bus voltage of a direct current traction network. That is, when the direct current bus voltage of the traction network is higher than a set charging threshold, the energy storage device enters a charging mode, and when the direct current bus voltage of the traction network is lower than a set discharging threshold, the energy storage device enters a discharging mode, and the charging and discharging currents are given by the output result of a voltage loop. The upper management method mostly uses adaptive management strategies (such as fuzzy control, reinforcement learning and other algorithms) to realize the adaptive adjustment of the charging and discharging thresholds. The control and management schematic diagram is shown in FIG. 1.

The above control and management method can better realize the recovery and utilization of regenerative braking energy of urban rail transit trains, and achieve better energy-saving effect. However, due to the time-varying operating load of the urban rail transit and the collaborative application of multi-energy storage devices, the above control and management method has some shortcomings and deficiencies in the benefit implementation during the whole life cycle of the supercapacitor energy storage device, which mainly include the following aspects.

(1) On a short-time scale (in units of seconds), the underlying control method uses a double closed-loop control method. Due to the characteristics of the PI control method, this method easily results in voltage oscillation and instability of a direct current network in the application of full-line multi-energy storage devices.

(2) On a medium-time scale (in units of hours), the distribution characteristics of line regenerative energy under different departure intervals are not fully considered, which leads to unreasonable setting of control parameters, thus affecting energy-saving benefits.

(3) On a long-time scale (in units of days), due to the attenuation of supercapacitors during use, failure to adjust and optimize the control strategies in time will lead to the problems of life abuse and poor balance of some energy storage devices, which will further affect the application benefits during the whole life cycle.

SUMMARY

In view of this, the present disclosure provides a control method, device, apparatus and storage medium for a rail transit supercapacitor energy storage device, and solves the problem that the multi-ground supercapacitor energy storage device of the urban rail transit has poor application benefit during the whole life cycle.

In a first aspect, an embodiment of the present disclosure provides a control method for a supercapacitor energy storage device, including:

collecting, in a first-time scale period, life characterization parameters of the supercapacitor energy storage device and performing life evaluation to obtain a life evaluation result, inputting the life evaluation result into a constructed fuzzy rule base, and outputting a constraint condition adjustment parameter;

obtaining, in a second-time scale period, a constraint condition according to the constraint condition adjustment parameter, and optimizing control parameters using a genetic algorithm in conjunction with an optimized objective function to obtain first control parameters, where the second-time scale period is less than the first-time scale period; and controlling, in a third-time scale period, a charging current and a discharging current of the supercapacitor energy storage device using a droop control method according to the first control parameters, where the third-time scale period is less than the second-time scale period.

According to the control method for the super-capacitor energy storage device provided by the present disclosure, different-time scale periods are set according to different control requirements of the super-capacitor energy storage device, and the super-capacitor energy storage device is controlled and managed in different time scales. A control strategy is adjusted and optimized in time, and the unreasonable use of the supercapacitor energy storage device is reduced, thereby improving the energy-saving effect and the application benefit during the whole life cycle.

Optionally, the life evaluation result includes a life evaluation value and a life evaluation difference, where a calculation formula for the life evaluation value is:

$$\mathrm{life}(j)=w_1\cdot C_{sc}(j)+w_2\cdot R_{sc}(j)$$

where life(j) is a life evaluation value of a j-th station, $C_{sc}(j)$ and $R_{sc}(j)$ are real-time states of capacitance and internal resistance of a supercapacitor at the j-th station, respectively, and $w_1$ and $w_2$ are evaluation weights of the capacitance and the internal resistance of the supercapacitor at the j-th station, respectively;

a calculation formula for life evaluation difference is:

$$\Delta life(j)=\alpha_1\cdot[life(j)-life(j-1)]+\alpha_2\cdot[life(j)-life(j+1)]$$

where Δlife(j) is a life evaluation difference, and $\alpha_1$ and $\alpha_2$ are balance differences between the supercapacitor at the j-th station and a supercapacitor at an adjacent station.

The life evaluation value reflects a life state at the j-th station, and the life evaluation difference reflects a life difference from a station adjacent to the j-th station. Through these two values, the overall life of the supercapacitor energy storage device can be reflected, which is convenient to be adjusted in time, so as to optimize the life of the supercapacitor energy storage device.

Optionally, inputting the life evaluation result into the constructed fuzzy rule base and outputting the constraint condition adjustment parameter includes:

determining, by the fuzzy rule base, a life state according to the life evaluation value, and determining a life state difference from the adjacent station according to the life evaluation difference; and determining the constraint condition adjustment parameter according to the life state and the life state difference from the adjacent station.

By evaluating the life of the supercapacitor energy storage device, the control strategy is adjusted and optimized in time, so as to make full use of the life of the supercapacitor energy storage device, improve the balance, and then improve the application benefit during the whole life cycle.

Optionally, the optimized objective function is:

$$e\% = \left(\frac{\sum_1^n E_{sub\_non}(j) - \sum_1^n E_{sub\_ess}(j)}{\sum_1^n E_{sub\_non}(j)}\right) * 100\%$$

where e % is an energy saving rate of application of the supercapacitor energy storage device, $E_{sub\_non}(j)$ is an output energy consumption before the application of the supercapacitor energy storage device at a j-th substation, $E_{sub\_ess}(j)$ is an output energy consumption after the application of the supercapacitor energy storage device at the j-th substation.

By establishing the optimized objective function and adjusting the intelligent control parameters in the calculation of a genetic algorithm, the purpose of the highest energy-saving rate of the objective function is achieved, and the energy-saving effect of the supercapacitor energy storage device is optimized.

Optionally, the constraint condition is:

$$\begin{cases} u_{ds} \le u_{dc}0 \le u_{ch} \\ soc_{min} \le soc(t) \le soc_{max} \\ 0 \le i_{sc}(t) \le i_{sc\_max} \end{cases}$$

where $u_{dc}0$ is a no-load voltage of a direct current traction network, $u_{ds}$ and $u_{ch}$ are a discharge start threshold and a charge start threshold, respectively, $soc_{max}$ and $soc_{min}$ are upper and lower limits of an soc working range, and $i_{sc\_max}$ is a limit of the charging current and the discharging current By establishing the constraint condition, the optimal configuration of different operation intervals is realized.

Optionally, optimizing the control parameters using the genetic algorithm to obtain the first control parameters includes:

initializing the control parameters to generate a first-generation control parameter population, where the control parameters include a discharge start threshold, a charge start threshold, a charge slope and a discharge slope of the supercapacitor energy storage device;

calculating a first fitness of the first-generation control parameter population according to the optimized objective function;

performing selection, crossover and mutation operations according to the constraint condition and the first fitness, to generate a next-generation control parameter population; and cyclically calculating a fitness of the control parameter population to obtain the first control parameters, where the first control parameters include a first discharge start threshold, a first charge start threshold, a first charge slope and a first discharge slope of the supercapacitor energy storage device.

The control parameters are optimized using a genetic algorithm, which only needs the optimized objective function and the corresponding constraint condition that affect the search direction, so that the solution of complex problems is simplified and the obtained first control parameters are more accurate.

Optionally, controlling the charging current and the discharging current of the supercapacitor energy storage device using the droop control method according to the first control parameters includes:

acquiring a traction network voltage for the supercapacitor energy storage device;

judging a working area of the supercapacitor energy storage device by comparing the traction network voltage with the first discharge start threshold and the first charge start threshold, where when the traction network voltage is greater than the charge start threshold, the supercapacitor energy storage device enters a charging state, and when the traction network voltage is less than the discharge start threshold, the supercapacitor energy storage device enters a discharging state; and controlling the charging current or the discharging current of the supercapacitor energy storage device according to the traction network voltage and the charge slope or the discharge slope.

By comparing the traction network voltage for the supercapacitor energy storage device with the first control parameters, the energy storage device can enter different working areas in time, and the charging and discharging currents can be accurately controlled by droop control, so that the direct current network voltage can be controlled more stably in the application of a full-line multi-energy storage device.

In a second aspect, an embodiment of the present disclosure provides a control device for a supercapacitor energy storage device, including:

a first-time scale management layer module, configured to, in a first-time scale period, collect life characterization parameters of the supercapacitor energy storage device and perform life evaluation to obtain a life evaluation result, input the life evaluation result into a constructed fuzzy rule base, and output a constraint condition adjustment parameter;

a second-time scale management layer module, configured to, in a second-time scale period, obtain a constraint condition according to the constraint condition adjustment parameter, and optimize control parameters using a genetic algorithm in conjunction with an optimized objective function to obtain first control parameters, where the second-time scale period is less than the first-time scale period; and a third-time scale management layer module, configured to, in a third-time scale period, control a charging current and a discharging current of the supercapacitor energy storage device using a droop control method according to the first control parameters, where the third-time scale period is less than the second-time scale period.

According to the control device for the super-capacitor energy storage device provided by the present disclosure, different-time scale management layer modules are set according to different control requirements of the super-capacitor energy storage device, and the super-capacitor energy storage device is controlled and managed in different time scales. A control strategy is adjusted and optimized in time, and the unreasonable use of the supercapacitor energy storage device is reduced, thereby improving the energy-saving effect and the application benefit during the whole life cycle.

In a third aspect, an embodiment of the present disclosure provides a computer apparatus, including a memory and a processor, where the memory and the processor are in communication connection with each other, the memory stores computer instructions, and the processor runs the computer instructions to execute the method described in the first aspect or any alternative embodiment of the first aspect.

In a fourth aspect, an embodiment of the present disclosure provides a computer-readable storage medium, where the computer-readable storage medium stores computer instructions for causing a computer to execute the method described in the first aspect or any alternative embodiment of the first aspect.

BRIEF DESCRIPTION OF THE DRAWINGS

To describe the technical solutions in the embodiments of the present disclosure or the prior art more clearly, the drawings required for describing the embodiments or the prior art will be briefly introduced hereinafter. Apparently, the drawings in the following description are only some embodiments of the present disclosure. For those skilled in the art, other drawings can be obtained according to these drawings without any creative effort.

DETAILED DESCRIPTION OF THE EMBODIMENTS

Figure 1:
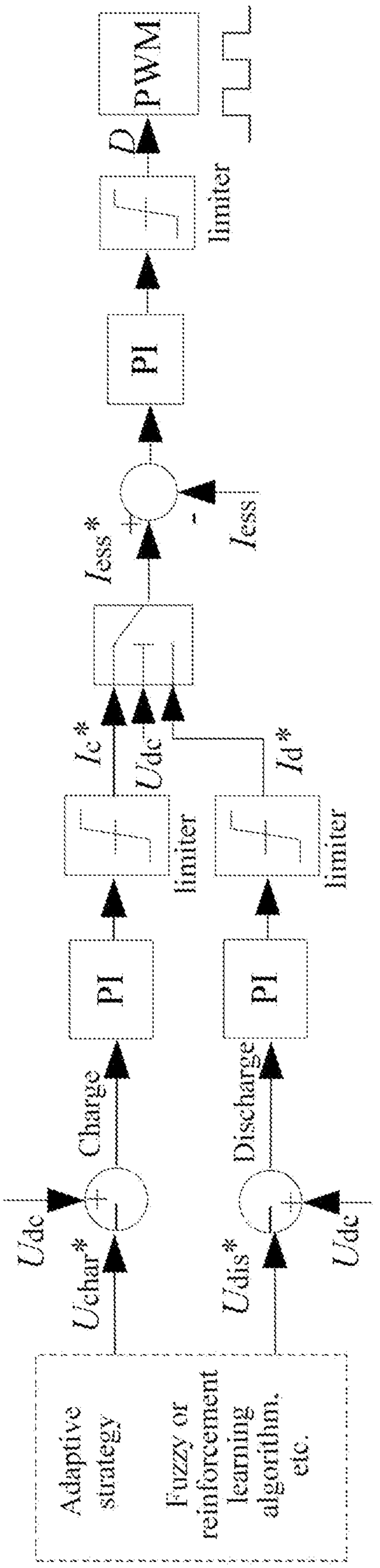
FIG. 1 is a schematic diagram of an upper control for a supercapacitor energy storage device in the prior art according to an embodiment of the present disclosure.

To make the purpose, technical solution and advantages of the embodiment of the present disclosure more clear, the technical solution in the embodiment of the present disclosure will be clearly and completely described hereinafter with reference to the accompanying drawings. Apparently, the described embodiments are merely part rather than all of the embodiments of the present disclosure. All other embodiments obtained by those skilled in the art based on the embodiments of the present disclosure without any creative effort belong to the protection scope of the present disclosure.

In the description of the present disclosure, it should be noted that the orientational or positional relationships indicated by the terms such as "center", "up", "down", "left", "right", "vertical", "horizontal", "inside" and "outside" are based on the orientational or positional relationships shown in the drawings only for the convenience of describing the present disclosure and the simplification of description, rather than indicate or imply that the referred devices or elements must have a specific orientation, be constructed and operated in a specific orientation, and therefore should not be construed as limiting the present disclosure. In addition, the terms such as "first", "second" and "third" are only used for the purpose of description, and cannot be understood as indicating or implying relative importance.

In the description of the present disclosure, it should also be noted that unless otherwise specified and defined expressly, the terms such as "mount", "link" and "connect" should be understood broadly, for example, it can be fixed connection, detachable connection or integral connection; or mechanical connection or electrical connection; or direct connection or indirect connection through an intermediate medium, or internal communication between two elements, or wireless or wired connection. For those skilled in the art, the specific meanings of the above terms in the present disclosure can be understood according to specific situations.

The technical features involved in different embodiments of the present disclosure described hereinafter can be combined with each other as long as they do not conflict with each other.

Figure 2:
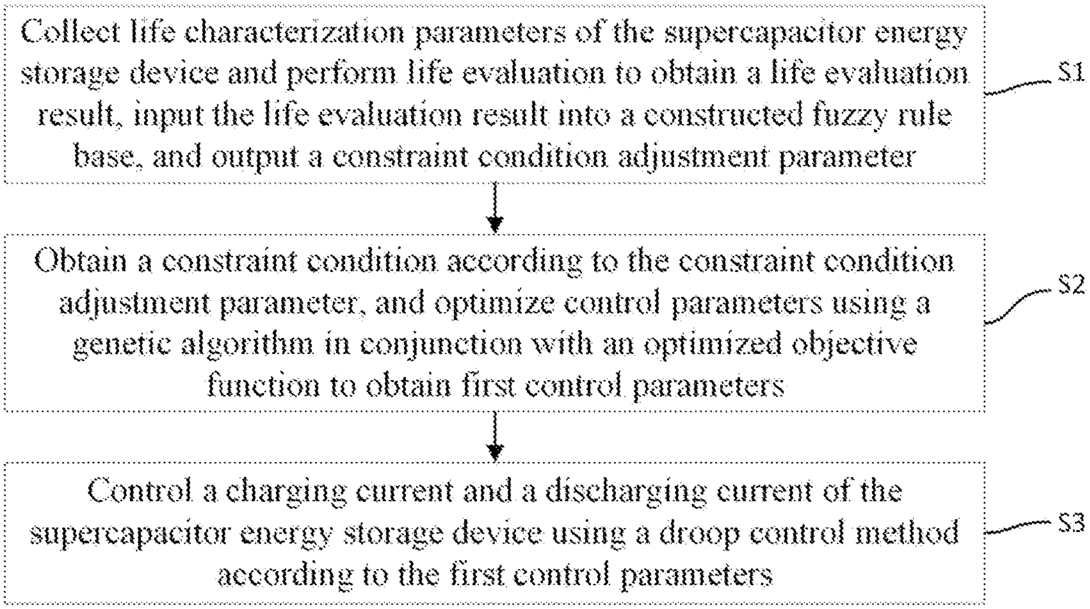
FIG. 2 is a flow chart of a control method for a supercapacitor energy storage device according to an embodiment of the present disclosure.

An embodiment of the present disclosure provides a control method for a supercapacitor energy storage device, which controls and manages the supercapacitor energy storage device from different time scales according to different functional layers, as shown in FIG. 2, and specifically includes the following steps S1-S3.

In step S1, in a first-time scale period, life characterization parameters of the supercapacitor energy storage device are collected and life evaluation is carried out to obtain a life evaluation result, the life evaluation result is input into a constructed fuzzy rule base, and a constraint condition adjustment parameter is output.

For example, the first-time scale period is measured in "days", which is not limited thereto and can be adjusted according to the actual situation. This step is a function realized by a long-time scale management layer, and mainly realizes the generation and adjustment of constraint conditions and collaborative management among different energy storage devices, which is the top-level optimization link of the control method for the super-capacitor energy storage device according to an embodiment of the present disclosure. This layer first evaluates the real-time life states of different supercapacitor energy storage devices, then establishes control rules based on a fuzzy algorithm to generate constraint condition adjustment parameters, and finally updates the optimized and adjusted constraint condition adjustment parameters in the second-time scale management layer.

For example, the life state of the supercapacitor is mainly characterized by the decrease of the capacitance and the increase of the internal resistance, so that the life state can be evaluated by monitoring the data of the capacitance and the internal resistance of the supercapacitor. The weight relationship between the capacitance and the internal resistance depends on the parameter design of different products and can be obtained through product manuals. The life evaluation result includes a life evaluation value and a life evaluation difference, where the calculation formula for the life evaluation value is:

$$\mathrm{life}(j)=w_1\cdot C_{sc}(j)+w_2\cdot R_{sc}(j)$$

where life(j) is a life evaluation value of a j-th station, $C_{sc}(j)$ and $R_{sc}(j)$ are real-time states of capacitance and internal resistance of the supercapacitor, respectively, and $w_1$ and $w_2$ are evaluation weights of the capacitance and the internal resistance of a supercapacitor at the j-th station, respectively;

the calculation formula for the life evaluation difference is:

$$\Delta\mathrm{life}(j)=\alpha_1\cdot[\mathrm{life}(j)-\mathrm{life}(j-1)]+\alpha_2\cdot[\mathrm{life}(j)-\mathrm{life}(j+1)]$$

where Δlife(j) is a life evaluation difference, and $\alpha_1$ and $\alpha_2$ are balance differences between the supercapacitor at the j-th station and the supercapacitor at an adjacent station.

The life evaluation value reflects the life state at the j-th station, and the life evaluation difference reflects the life difference from a station adjacent to the j-th station. Through these two values, the overall life of the supercapacitor energy storage device can be reflected, which is convenient to be adjusted in time, so as to optimize the life of the supercapacitor energy storage device.

Figure 3:
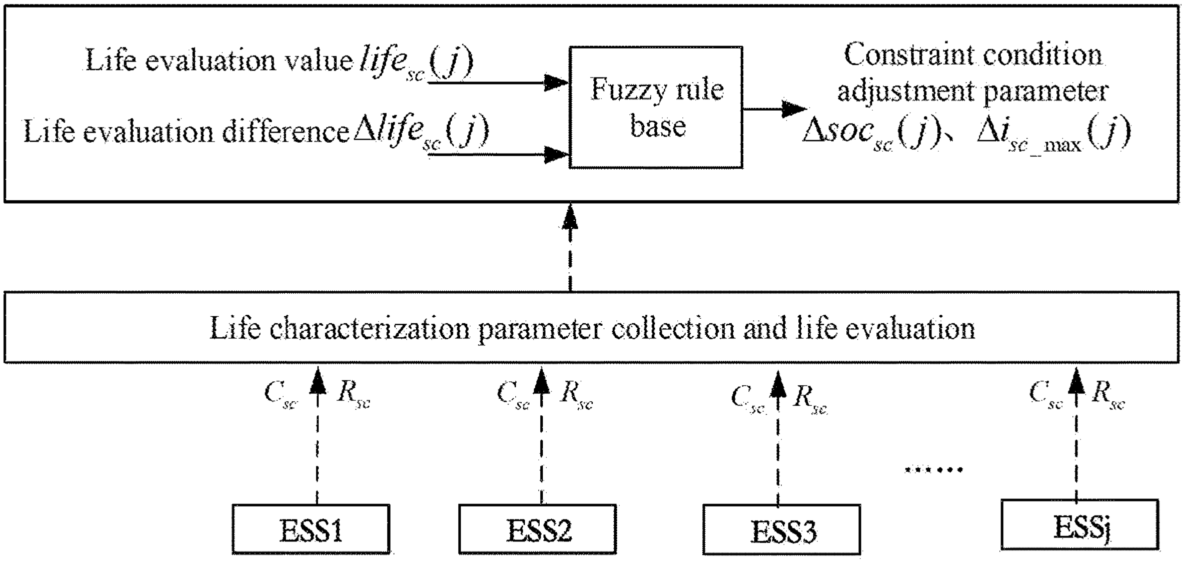
FIG. 3 is an overall framework diagram of a long-time scale management layer in a control method for a supercapacitor energy storage device according to an embodiment of the present disclosure.

For example, FIG. 3 is an overall framework diagram of a long-time scale management layer. ESS1-ESSj represent a plurality of supercapacitors. By acquiring the capacitance $C_{sc}(j)$ and the internal resistance $R_{sc}(j)$ of each supercapacitor, the life evaluation value is obtained to determine the life state. The fuzzy rule base determines the life state according to the life evaluation value, determines the life state difference from an adjacent station according to the life evaluation difference, and determines the constraint condition adjustment parameter according to the life state and the life state difference from the adjacent station. Because the life of the supercapacitor is negatively correlated with its service voltage and the charging and discharging currents, that is, the higher the service voltage and the larger the charging and discharging currents, the shorter its life will be; the lower the service voltage and the smaller the charging and discharging currents, the longer its life will be; the service voltage is represented by SOC (State Of Charge). In an embodiment, first, a fuzzy rule base is established according to the trend correspondence among the life state of the station, the life state difference from an adjacent station, the service voltage and the charging and discharging currents; second, the fuzzy rule base table is queried through the above evaluation results of the life state of this station and the life state difference from the adjacent station, and the corresponding service voltage and charging and discharging current adjustments are found; finally, this result is regarded as the output of the long-time scale and as the input of the medium-time scale.

In a specific embodiment, the life evaluation value is defined as "good", "medium" and "poor", and the life evaluation difference is defined as "big, "medium" and "small". In order to reduce the life difference from an adjacent station, the rules for adjusting the SOC and the charging and discharging current parameters of this station and the adjacent station are as follows.

If the life state of the supercapacitor energy storage device at a certain station is "good", and the life state difference between the station and the adjacent station is "big", it indicates that the adjacent station has a high degree of abuse. Therefore, the SOC upper limit and charging and discharging current adjustments corresponding to the station are "big upward adjustment".

If the life state of the supercapacitor energy storage device at a certain station is "good", and the life state difference between the station and the adjacent station is "medium", it indicates that the adjacent station has a medium degree of abuse. Therefore, the SOC upper limit and charging and discharging current adjustments corresponding to the station are "small upward adjustment".

If the life state of the supercapacitor energy storage device at a certain station is "good", and the life state difference between the station and the adjacent station is "small", it indicates that there is no abuse in the adjacent station. Therefore, the SOC upper limit and charging and discharging current adjustments corresponding to the station are "no adjustment".

If the life state of the supercapacitor energy storage device at a certain station is "medium", and the life state difference between the station and the adjacent station is "big", it indicates that the station has a high degree of abuse. Therefore, the SOC upper limit and charging and discharging current adjustments corresponding to the station are "big downward adjustment".

If the life state of the supercapacitor energy storage device at a certain station is "medium", and the life state difference between the station and the adjacent station is "medium", it indicates that the station has a medium degree of abuse. Therefore, the SOC upper limit and charging and discharging current adjustments corresponding to the station are "small downward adjustment".

If the life state of the supercapacitor energy storage device at a certain station is "medium", and the life state difference between the station and the adjacent station is "small", it indicates that there is no abuse in the adjacent station. Therefore, the SOC upper limit and charging and discharging current adjustments corresponding to the station are "no adjustment".

If the life state of the supercapacitor energy storage device at a certain station is "poor", and the life state difference between the station and the adjacent station is "big", it indicates that the station has a high degree of abuse. Therefore, the SOC upper limit and charging and discharging current adjustments corresponding to the station are "big downward adjustment".

If the life state of the supercapacitor energy storage device at a certain station is "poor", and the life state difference between the station and the adjacent station is "medium", it indicates that the station has a medium degree of abuse. Therefore, the SOC upper limit and charging and discharging current adjustments corresponding to the station are "small downward adjustment".

If the life state of the supercapacitor energy storage device at a certain station is "poor", and the life state difference between the station and the adjacent station is "small", it indicates that there is no high abuse in the station. Therefore, the SOC upper limit and charging and discharging current adjustments corresponding to the station are "no adjustment".

By evaluating the life of the supercapacitor energy storage device, the control strategy is adjusted and optimized in time, so as to make full use of the life of the supercapacitor energy storage device, improve the balance, and then improve the application benefit during the whole life cycle.

In step S2, in a second-time scale period, a constraint condition is obtained according to the constraint condition adjustment parameter, and control parameters are optimized using a genetic algorithm in conjunction with the optimized objective function to obtain first control parameters, where the second-time scale period is less than the first-time scale period.

Figure 4:
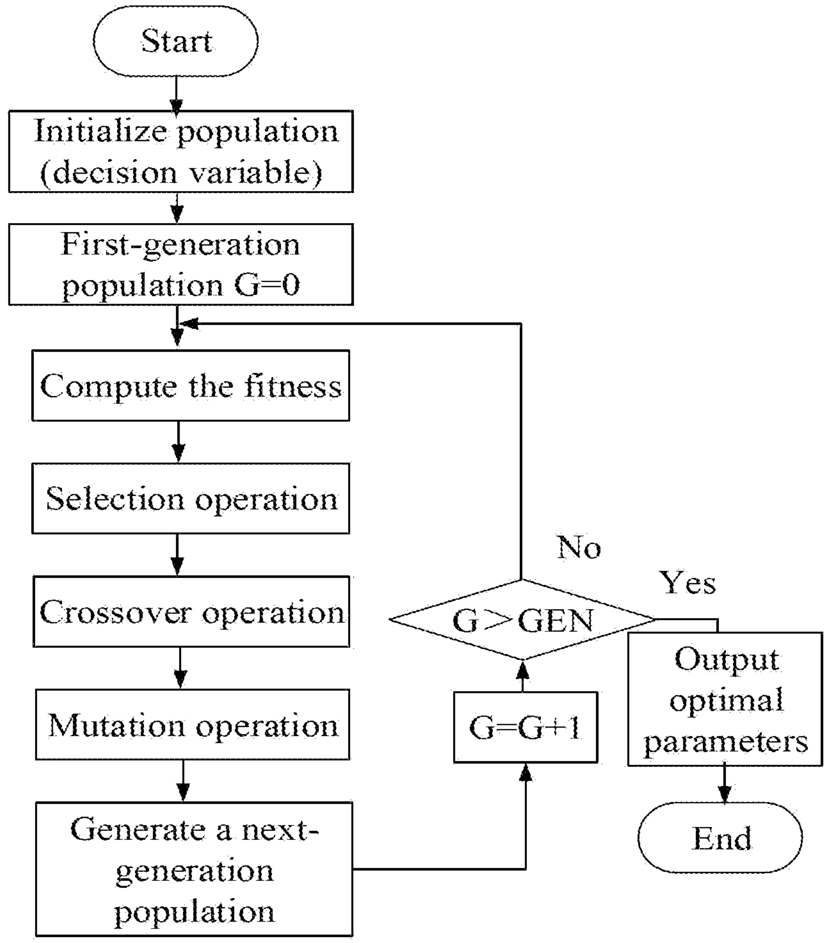
FIG. 4 is a flow chart of a genetic algorithm in a control method for a supercapacitor energy storage device according to an embodiment of the present disclosure.

For example, the second-time scale period is measured in "hours", which is not limited thereto and can be adjusted according to the actual situation. This step is a function realized by a medium-time scale management layer, and mainly realizes the generation and optimization of control parameters and the optimal matching with different operation intervals, which is a key decision-making layer of the method proposed by the present disclosure. FIG. 4 is a flow chart of a genetic algorithm. The genetic algorithm is the prior art, which will not be repeated here.

Specifically, in one embodiment, the optimized objective function is:

$$e\% = \left( \frac{\sum_1^n E_{sub\_non}(j) - \sum_1^n E_{sub\_ess}(j)}{\sum_1^n E_{sub\_non}(j)} \right) * 100\%$$

where e % is an energy saving rate of application of the supercapacitor energy storage device, $E_{sub\_non}(j)$ is an output energy consumption before the application of the supercapacitor energy storage device at a j-th substation, and $E_{sub\_ess}(j)$ is an output energy consumption after the application of the supercapacitor energy storage device at the j-th substation.

By establishing the optimized objective function and adjusting the control parameters in the calculation of a genetic algorithm, the purpose of the highest energy-saving rate of the objective function is achieved, and the energy-saving effect of the supercapacitor energy storage device is optimized.

Specifically, in one embodiment, the constraint condition is:

$$\begin{cases} u_{ds} \le u_{dc0} \le u_{ch} \\ soc_{min} \le soc(t) \le soc_{max} \\ 0 \le i_{sc}(t) \le i_{sc\_max} \end{cases}$$

where $u_{dc}0$ is a no-load voltage of a direct current traction network, $u_{ds}$ and $u_{ch}$ are a discharge start threshold and a charge start threshold, respectively, $soc_{max}$ and $soc_{min}$ are upper and lower limits of an soc working range, generally, $soc_{min}$ is a fixed value of 0, and is, max is a limit of the charging and discharging currents.

By establishing the constraint condition, the constraint condition adjustment parameter obtained using a long-time scale management layer is updated to realize the optimal configuration of different operation intervals.

Specifically, in one embodiment, optimizing control parameters using the genetic algorithm to obtain the first control parameters includes the following specific steps S21-S24.

In step S21, the control parameters are initialized to generate a first-generation control parameter population. The formula for optimizing control parameters using the genetic algorithm is as follows:

$$X(j)=[u_{ch},\lambda_{ch},u_{ds},\lambda_{ds}]$$

where $u_{ds}$, $u_{ch}$, $\lambda_{ch}$ and $\lambda_{ds}$ are control parameters, $u_{ds}$ and $u_{ch}$ are a discharge start threshold and a charge start threshold, respectively, and $\lambda_{ch}$ and $\lambda_{ds}$ are the charge slope and the discharge slope, respectively.

In step S22, a first fitness of the first-generation control parameter population is calculated according to the optimized objective function.

In step S23, according to the constraint condition and the first fitness, selection, crossover and mutation operations are carried out to generate a next-generation control parameter population.

In step S24, a fitness of the control parameter population is cyclically calculated to obtain first control parameters, where the first control parameters include a first discharge start threshold, a first charge start threshold, a first charge slope and a first discharge slope of the supercapacitor energy storage device.

Specifically, the optimized objective function is the evaluation of fitness. Taking 1.5 MW supercapacitor energy storage devices at two stations as an example, the supercapacitor energy storage device at each station is provided with a set of control parameters. If the energy saving rate is 9% when a first set of data is X(1)=[870,0.3,780,0.4], X(2)=[875,0.2,785,0.2], and the energy saving rate is 10% when a second set of data is X(1)=[860,0.3,790,0.4], X(2)=[870,0.2,775,0.1], the second set of data has a better control effect and higher fitness in the genetic algorithm, and the second set of data is taken as the first control parameters.

The control parameters are optimized using the genetic algorithm, which only needs the optimized objective function and the corresponding constraint condition that affect the search direction, so that the solution of complex problems is simplified and the obtained first control parameters are more accurate.

Figure 5:
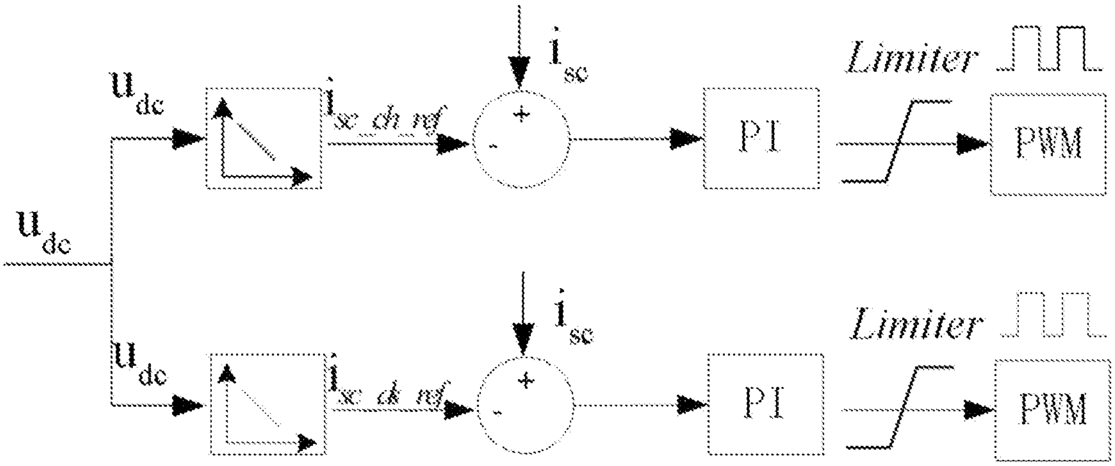
FIG. 5 is a control block diagram of a short-time scale management layer in a control method for a supercapacitor energy storage device according to an embodiment of the present disclosure.

In step S3, in a third-time scale period, charging and discharging currents of the supercapacitor energy storage device are controlled using a droop control method according to the first control parameters, where the third-time scale period is less than the second-time scale period. For example, the third-time scale period is measured in "seconds", which is not limited thereto and can be adjusted according to the actual situation. This step is a function realized by a short-time scale management layer, and mainly realizes the real-time control of the supercapacitor energy storage device, which is a basic control layer of the method proposed by the present disclosure. The control block diagram is shown in FIG. 5.

Specifically, in an embodiment, controlling charging and discharging currents of the supercapacitor energy storage device using a droop control method according to the first control parameters includes the following specific steps S31-S33.

In step S31, a traction network voltage for the supercapacitor energy storage device is acquired.

In step S32, a working area of the supercapacitor energy storage device is judged by comparing the traction network voltage with a first discharge start threshold and a first charge start threshold, where when the traction network voltage is greater than the charge start threshold, the supercapacitor energy storage device enters a charging state, and when the traction network voltage is less than the discharge start threshold, the supercapacitor energy storage device enters a discharging state, and when the traction network voltage is less than the charge start threshold and greater than the discharge start threshold, the supercapacitor energy storage device enters the standby state.

Figure 6:
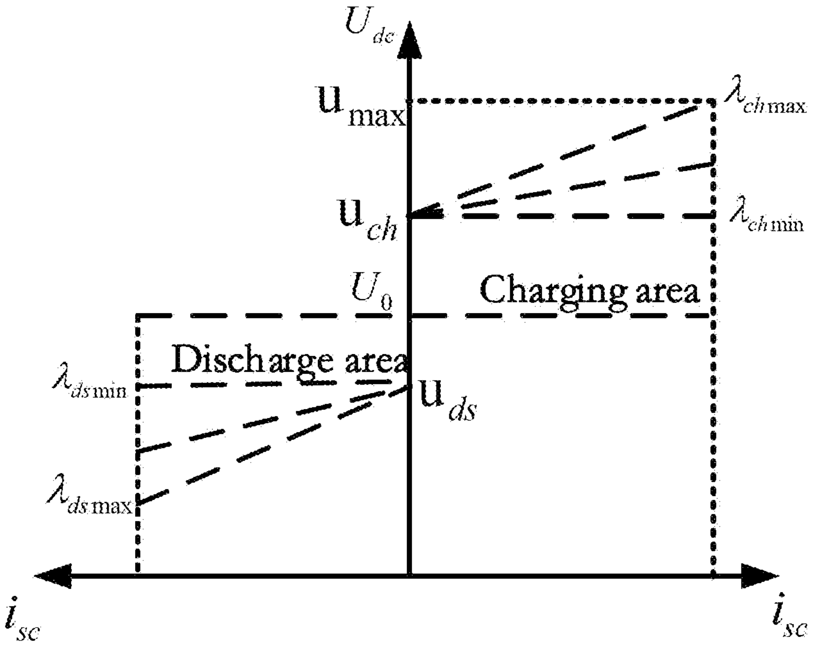
FIG. 6 is a diagram of the relationship between charging and discharging currents of a supercapacitor energy storage device controlled by droop and a traction network voltage in a specific embodiment of a control method for a supercapacitor energy storage device according to an embodiment of the present disclosure.

In step S33, the charging current or the discharging current of the supercapacitor energy storage device is controlled according to the traction network voltage and the charge slope or the discharge slope. FIG. 6 shows the relationship between the charging and discharging currents of the supercapacitor energy storage device in droop control and the traction network voltage. In FIG. 6, the abscissa represents the charging and discharging currents of the supercapacitor, and the ordinate represents the traction network voltage. $\lambda_{ch}$ and $\lambda_{ds}$ represent the charging rate and the discharging rate, respectively, that is, the speed to reach the maximum power. The greater the slope, the slower the speed. $\lambda_{ch}$ max represents the maximum charging rate, and $\lambda_{ch}$ mm represents the minimum charging rate; $\lambda_{ds\_max}$ represents the maximum discharging rate, and $\lambda_{ds\_min}$ represents the minimum discharging rate. The area in the left quadrant is the supercapacitor discharging area, and the area in the right quadrant is the supercapacitor charging area. When the supercapacitor energy storage device works in the charging area, the supercapacitor charging current is correspondingly obtained in the right quadrant of FIG. 6 through the detected traction network voltage. When the supercapacitor energy storage device works in the discharging area, the supercapacitor discharging current is correspondingly obtained in the left quadrant of FIG. 6 through the detected traction network voltage.

By comparing the traction network voltage for the supercapacitor energy storage device with the first control parameters, the energy storage device can enter different working areas in time, and the charging and discharging currents can be accurately controlled by droop control, so that the direct current network voltage can be controlled more stably in the application of a full-line multi-energy storage devices.

According to the control method for the super-capacitor energy storage device provided by the present disclosure, different-time scale periods are set according to different control requirements of the super-capacitor energy storage device, and the super-capacitor energy storage device is controlled and managed in different time scales. A control strategy is adjusted and optimized in time, and the unreasonable use of the supercapacitor energy storage device is reduced, thereby improving the energy-saving effect and the application benefit during the whole life cycle.

Figure 7:
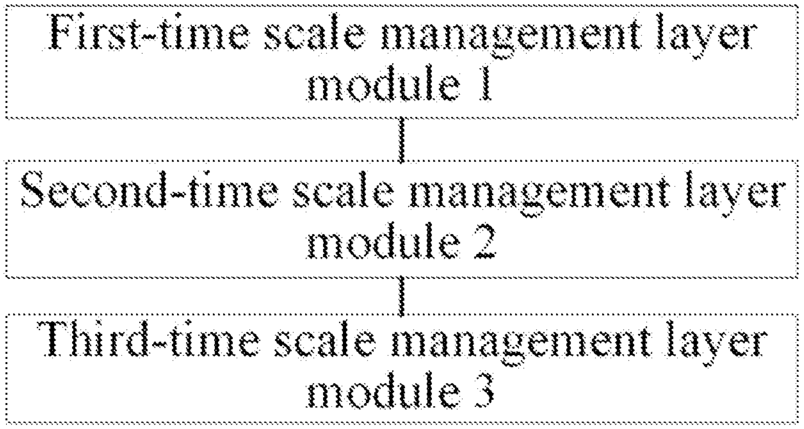
FIG. 7 is a schematic structural diagram of a control device for a super-capacitor energy storage device according to an embodiment of the present disclosure.

An embodiment of the present disclosure provides a control device for a supercapacitor energy storage device, as shown in FIG. 7, including a first-time scale management layer module 1, a second-time scale management layer module 2, and a third-time scale management layer module 3.

The first-time scale management layer module 1 is configured to, in a first-time scale period, collect life characterization parameters of the supercapacitor energy storage device and perform life evaluation to obtain a life evaluation result, input the life evaluation result into a constructed fuzzy rule base, and output a constraint condition adjustment parameter. The related description of Step S1 in the above method embodiment can be referred to for details, which will not be repeated here.

The second-time scale management layer module 2 is configured to, in a second-time scale period, obtain a constraint condition according to the constraint condition adjustment parameter, and optimize control parameters using a genetic algorithm in conjunction with the optimized objective function to obtain first control parameters, where the second-time scale period is less than the first-time scale period. The related description of Step S2 in the above method embodiment can be referred to for details, which will not be repeated here.

The third-time scale management layer module 3 is configured to, in a third-time scale period, control charging and discharging currents of the supercapacitor energy storage device using a droop control method according to the first control parameters, where the third-time scale period is less than the second-time scale period. The related description of Step S3 in the above method embodiment can be referred to for details, which will not be repeated here.

According to the control device for the super-capacitor energy storage device provided by the present disclosure, different-time scale management layer modules are set according to different control requirements of the super-capacitor energy storage device, and the super-capacitor energy storage device is controlled and managed in different time scales. A control strategy is adjusted and optimized in time, and the unreasonable use of the supercapacitor energy storage device is reduced, thereby improving the energy-saving effect and the application benefit during the whole life cycle.

Figure 8:
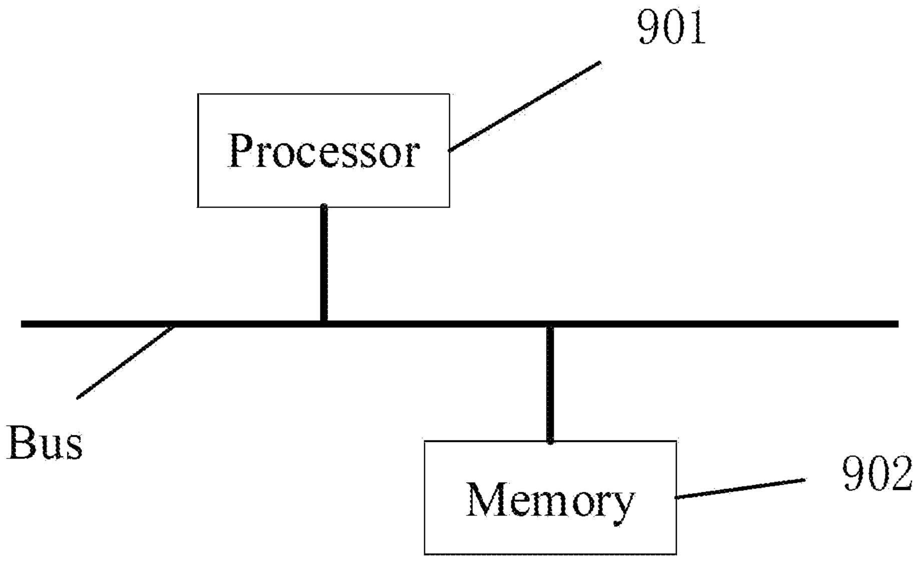
FIG. 8 is a schematic structural diagram of a computer apparatus according to an embodiment of the present disclosure.

FIG. 8 shows a schematic structural diagram of a computer apparatus according to an embodiment of the present disclosure, including a processor 901 and a memory 902, where the processor 901 and the memory 902 can be connected by a bus or other means. As an example, the processor and the memory are connected by a bus in FIG. 8.

The processor 901 may be a Central Processing Unit (CPU). The processor 901 can also be other general-purpose processors, Digital Signal Processors (DSPs), Application Specific Integrated Circuits (ASICs), Field-Programmable Gate Arrays (FPGAs) or other programmable logic devices, discrete gates or transistor logic devices, discrete hardware components and other chips, or a combination of the above chips.

As a non-transient computer-readable storage medium, the memory 902 can be used to store non-transient software programs, non-transient computer executable programs and modules, such as program instructions/modules corresponding to the methods in the above method embodiments. The processor 901 executes various functional applications and data processing of the processor by operating non-transient software programs, instructions and modules stored in the memory 902, that is, the method in the above method embodiment is implemented.

The memory 902 may include a storage program area and a storage data area, where the storage program area may store an operating system and an application program required by at least one function. The storage data area may store data created by the processor 901 and the like. In addition, the memory 902 may include a high-speed random access memory and a non-transient memory, such as at least one disk memory device, a flash memory device, or other non-transient solid-state memory devices. In some embodiments, the memory 902 may optionally include memories located remotely from the processor 901, and these remote memories may be connected to the processor 901 through a network. Examples of the above network include, but are not limited to, the Internet, an intranet, a local area network, a mobile communication network, and combinations thereof.

One or more modules are stored in the memory 902. The modules execute the method in the above method embodiment when executed by the processor 901.

The specific details of the above computer apparatus can be understood by referring to the corresponding related descriptions and effects in the above method embodiments, which will not be repeated here.

It can be understood by those skilled in the art that all or part of the processes in the above method embodiment can be completed by instructing related hardware through a computer program. The realized program can be stored in a computer-readable storage medium, and the program, when executed, can include the processes of the above method embodiments. The storage medium can be a magnetic disk, an optical disk, a Read-Only Memory (ROM), a Random Access Memory (RAM), a Flash Memory, a Hard Disk Drive (HDD) or a Solid-State Drive (SSD). The storage medium may also include a combination of the above types of memories.

Although the embodiments of the present disclosure have been described with reference to the drawings, various modifications and variations can be made by those skilled in the art without departing from the spirit and scope of the present disclosure, and such modifications and variations fall within the scope defined by the appended claims.

What is claimed is:

1. A control method for a supercapacitor energy storage device, comprising:

collecting, in a first-time scale period, life characterization parameters of the supercapacitor energy storage device and performing life evaluation to obtain a life evaluation result, inputting the life evaluation result into a constructed fuzzy rule base, and outputting a constraint condition adjustment parameter;

obtaining, in a second-time scale period, a constraint condition according to the constraint condition adjustment parameter, and optimizing control parameters using a genetic algorithm in conjunction with an optimized objective function to obtain first control parameters, wherein the second-time scale period is less than the first-time scale period; and controlling, in a third-time scale period, a charging current and a discharging current of the supercapacitor energy storage device using a droop control method according to the first control parameters, wherein the third-time scale period is less than the second-time scale period.

2. The control method according to claim 1, wherein the life evaluation result comprises a life evaluation value and a life evaluation difference, wherein a calculation formula for the life evaluation value is:

$$\text{life}(j)=w_1\cdot C_{sc}(j)+w_2\cdot R_{sc}(j)$$

wherein life(j) is a life evaluation value of a j-th station, $C_{sc}(j)$ and $R_{sc}(j)$ are real-time states of capacitance and internal resistance of a supercapacitor at the j-th station, respectively, and $w_1$ and $w_2$ are evaluation weights of the capacitance and the internal resistance of the supercapacitor at the j-th station, respectively;

a calculation formula for the life evaluation difference is:

$$\Delta\text{life}(j)=\alpha_1\cdot[\text{life}(j)-\text{life}(j-1)]+\alpha_2\cdot[\text{life}(j)-\text{life}(j+1)]$$

wherein Δlife(j) is a life evaluation difference, and $\alpha_1$ and $\alpha_2$ are balance differences between the supercapacitor at the j-th station and a supercapacitor at an adjacent station.

3. The control method according to claim 2, wherein inputting the life evaluation result into the constructed fuzzy rule base and outputting the constraint condition adjustment parameter comprises:

determining, by the fuzzy rule base, a life state according to the life evaluation value, and determining a life state difference from the adjacent station according to the life evaluation difference; and determining the constraint condition adjustment parameter according to the life state and the life state difference from the adjacent station.

4. The control method according to claim 1, wherein the optimized objective function is:

$$e\% = \left(\frac{\sum_1^n E_{sub\_non}(j) - \sum_1^n E_{sub\_ess}(j)}{\sum_1^n E_{sub\_non}(j)}\right) * 100\%$$

wherein e % is an energy saving rate of application of the supercapacitor energy storage device, $E_{sub\_non}(j)$ is an output energy consumption before the application of the supercapacitor energy storage device at a j-th substation, $E_{sub\_ess}(j)$ is an output energy consumption after the application of the supercapacitor energy storage device at the j-th substation, and n is a total number of substations involved in calculation of the energy saving rate.

5. The control method according to claim 4, wherein the constraint condition is:

$$\begin{cases} u_{ds} \le u_{dc0} \le u_{ch} \\ soc_{min} \le soc(t) \le soc_{max} \\ 0 \le i_{sc}(t) \le i_{sc\_max} \end{cases}$$

wherein $u_{dc}0$ is a no-load voltage of a direct current traction network, $u_{ds}$ and $u_{ch}$ are a discharge start threshold and a charge start threshold, respectively, $soc_{max}$ and $soc_{min}$ are upper and lower limits of an soc working range, and $i_{sc\_max}$ is a limit of the charging current and the discharging current.

6. The control method according to claim 5, wherein optimizing the control parameters using the genetic algorithm to obtain the first control parameters comprises:

initializing the control parameters to generate a first-generation control parameter population, wherein the control parameters comprise a discharge start threshold, a charge start threshold, a charge slope and a discharge slope of the supercapacitor energy storage device;

calculating a first fitness of the first-generation control parameter population according to the optimized objective function;

performing selection, crossover and mutation operations according to the constraint condition and the first fitness, to generate a next-generation control parameter population; and cyclically calculating a fitness of the control parameter population to obtain the first control parameters, wherein the first control parameters comprise a first discharge start threshold, a first charge start threshold, a first charge slope and a first discharge slope of the supercapacitor energy storage device.

7. The control method according to claim 6, wherein controlling the charging current and the discharging current of the supercapacitor energy storage device using the droop control method according to the first control parameters comprises:

acquiring a traction network voltage for the supercapacitor energy storage device;

judging a working area of the supercapacitor energy storage device by comparing the traction network voltage with the first discharge start threshold and the first charge start threshold, wherein when the traction network voltage is greater than the first charge start threshold, the supercapacitor energy storage device enters a charging state, and when the traction network voltage is less than the first discharge start threshold, the supercapacitor energy storage device enters a discharging state; and controlling the charging current of the supercapacitor energy storage device according to the traction network voltage and the first charge slope, and controlling the discharging current of the supercapacitor energy storage device according to the traction network voltage and the first discharge slope.

8. The control method according to claim 1, wherein the control method is used for controlling a supercapacitor energy storage device of a rail transit system having a plurality of stations, the supercapacitor energy storage device having a corresponding supercapacitor at each of the plurality of stations.

9. A computer apparatus, comprising a memory and a processor, wherein the memory and the processor are in communication connection with each other, the memory stores computer instructions, and the processor runs the computer instructions to execute the method according to claim 1.

10. The computer apparatus according to claim 9, wherein the life evaluation result comprises a life evaluation value and a life evaluation difference, wherein a calculation formula for the life evaluation value is:

$$\mathrm{life}(j)=w_1\cdot C_{sc}(j)+w_2\cdot R_{sc}(j)$$

wherein life(j) is a life evaluation value of a j-th station, $C_{sc}(j)$ and $R_{sc}(j)$ are real-time states of capacitance and internal resistance of a supercapacitor at the j-th station, respectively, and $w_1$ and $w_2$ are evaluation weights of the capacitance and the internal resistance of the supercapacitor at the j-th station, respectively;

a calculation formula for the life evaluation difference is:

$$\Delta\mathrm{life}(j)=\alpha_1\cdot[\mathrm{life}(j)-\mathrm{life}(j-1)]+\alpha_2\cdot[\mathrm{life}(j)-\mathrm{life}(j+1)]$$

wherein Δlife(j) is a life evaluation difference, and $\alpha_1$ and $\alpha_2$ are balance differences between the supercapacitor at the j-th station and a supercapacitor at an adjacent station.

11. The computer apparatus according to claim 10, wherein inputting the life evaluation result into the constructed fuzzy rule base and outputting the constraint condition adjustment parameter comprises:

determining, by the fuzzy rule base, a life state according to the life evaluation value, and determining a life state difference from the adjacent station according to the life evaluation difference; and determining the constraint condition adjustment parameter according to the life state and the life state difference from the adjacent station.

12. The computer apparatus according to claim 9, wherein the optimized objective function is:

$$e\% = \left(\frac{\sum_1^n E_{sub\_non}(j) - \sum_1^n E_{sub\_ess}(j)}{\sum_1^n E_{sub\_non}(j)}\right) * 100\%$$

wherein e % is an energy saving rate of application of the supercapacitor energy storage device, $E_{sub\_non}(j)$ is an output energy consumption before the application of the supercapacitor energy storage device at a j-th substation, $E_{sub\_ess}(j)$ is an output energy consumption after the application of the supercapacitor energy storage device at the j-th substation, and n is a total number of substations involved in calculation of the energy saving rate.

13. The computer apparatus according to claim 12, wherein the constraint condition is:

$$\begin{cases} u_{ds} \le u_{dc0} \le u_{ch} \\ soc_{min} \le soc(t) \le soc_{max} \\ 0 \le i_{sc}(t) \le i_{sc\_max} \end{cases}$$

wherein $u_{dc}0$ is a no-load voltage of a direct current traction network, $u_{ds}$ and $u_{ch}$ are a discharge start threshold and a charge start threshold, respectively, $soc_{max}$ and $soc_{min}$ are upper and lower limits of an soc working range, and $i_{sc\_max}$ is a limit of the charging current and the discharging current.

14. The computer apparatus according to claim 13, wherein optimizing the control parameters using the genetic algorithm to obtain the first control parameters comprises:

initializing the control parameters to generate a first-generation control parameter population, wherein the control parameters comprise a discharge start threshold, a charge start threshold, a charge slope and a discharge slope of the supercapacitor energy storage device;

calculating a first fitness of the first-generation control parameter population according to the optimized objective function;

performing selection, crossover and mutation operations according to the constraint condition and the first fitness, to generate a next-generation control parameter population; and cyclically calculating a fitness of the control parameter population to obtain the first control parameters, wherein the first control parameters comprise a first discharge start threshold, a first charge start threshold, a first charge slope and a first discharge slope of the supercapacitor energy storage device.

15. The computer apparatus according to claim 14, wherein controlling the charging current and the discharging current of the supercapacitor energy storage device using the droop control method according to the first control parameters comprises:

acquiring a traction network voltage for the supercapacitor energy storage device;

judging a working area of the supercapacitor energy storage device by comparing the traction network voltage with the first discharge start threshold and the first charge start threshold, wherein when the traction network voltage is greater than the first charge start threshold, the supercapacitor energy storage device enters a charging state, and when the traction network voltage is less than the first discharge start threshold, the supercapacitor energy storage device enters a discharging state; and controlling the charging current of the supercapacitor energy storage device according to the traction network voltage and the first charge slope, and controlling the discharging current of the supercapacitor energy storage device according to the traction network voltage and the first discharge slope.

16. The computer apparatus according to claim 9, wherein the method is used for controlling a supercapacitor energy storage device of a rail transit system having a plurality of stations, the supercapacitor energy storage device having a corresponding supercapacitor at each of the plurality of stations.

17. A computer-readable storage medium, wherein the computer-readable storage medium stores computer instructions for causing a computer to execute the method according to claim 1.

18. The computer-readable storage medium according to claim 17, wherein the life evaluation result comprises a life evaluation value and a life evaluation difference, wherein a calculation formula for the life evaluation value is:

$$\text{life}(j)=w_1\cdot C_{sc}(j)+w_2\cdot R_{sc}(j)$$

wherein life(j) is a life evaluation value of a j-th station, $C_{sc}(j)$ and $R_{sc}(j)$ are real-time states of capacitance and internal resistance of a supercapacitor at the j-th station, respectively, and $w_1$ and $w_2$ are evaluation weights of the capacitance and the internal resistance of the supercapacitor at the j-th station, respectively;

a calculation formula for the life evaluation difference is:

$$\Delta\text{life}(j)=\alpha_1\cdot[\text{life}(j)-\text{life}(j-1)]+\alpha_2\cdot[\text{life}(j)-\text{life}(j+1)]$$

wherein Δlife(j) is a life evaluation difference, and $\alpha_1$ and $\alpha_2$ are balance differences between the supercapacitor at the j-th station and a supercapacitor at an adjacent station.

19. A control device for a supercapacitor energy storage device, comprising:

a first-time scale management layer module, configured to, in a first-time scale period, collect life characterization parameters of the supercapacitor energy storage device and perform life evaluation to obtain a life evaluation result, input the life evaluation result into a constructed fuzzy rule base, and output a constraint condition adjustment parameter;

a second-time scale management layer module, configured to, in a second-time scale period, obtain a constraint condition according to the constraint condition adjustment parameter, and optimize control parameters using a genetic algorithm in conjunction with an optimized objective function to obtain first control parameters, wherein the second-time scale period is less than the first-time scale period; and a third-time scale management layer module, configured to, in a third-time scale period, control a charging current and a discharging current of the supercapacitor energy storage device using a droop control method according to the first control parameters, wherein the third-time scale period is less than the second-time scale period.

20. The control device according to claim 19, wherein the control device is used for controlling a supercapacitor energy storage device of a rail transit system having a plurality of stations, the supercapacitor energy storage device having a corresponding supercapacitor at each of the plurality of stations.

* * * * *